May 19, 1942.   E. R. GASSER   2,283,431
HYDRAULIC CLUTCH CONTROL SYSTEM
Filed Feb. 10, 1941   4 Sheets-Sheet 1
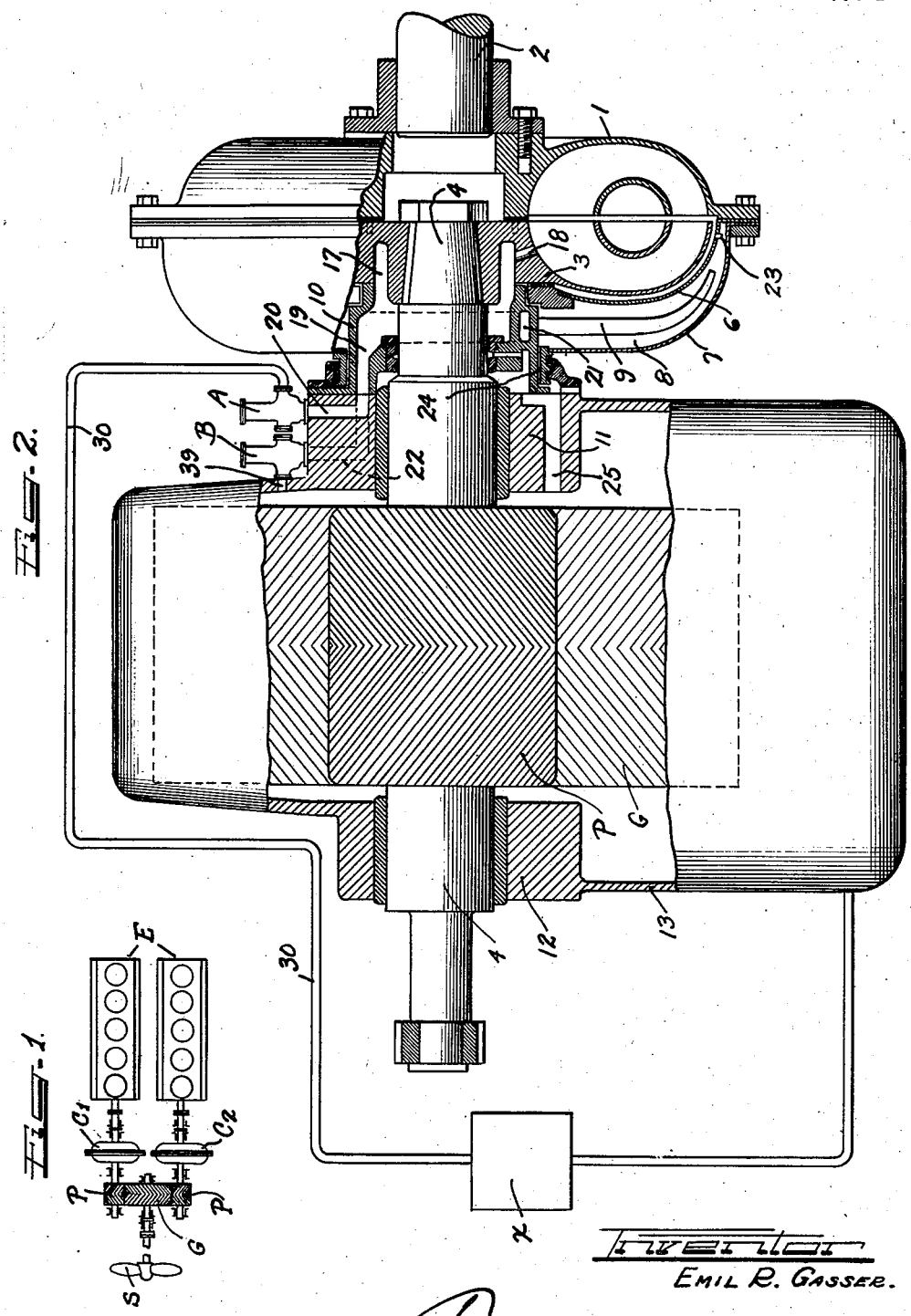
Inventor
Emil R. Gasser.
by Charles S. Wills Atty.

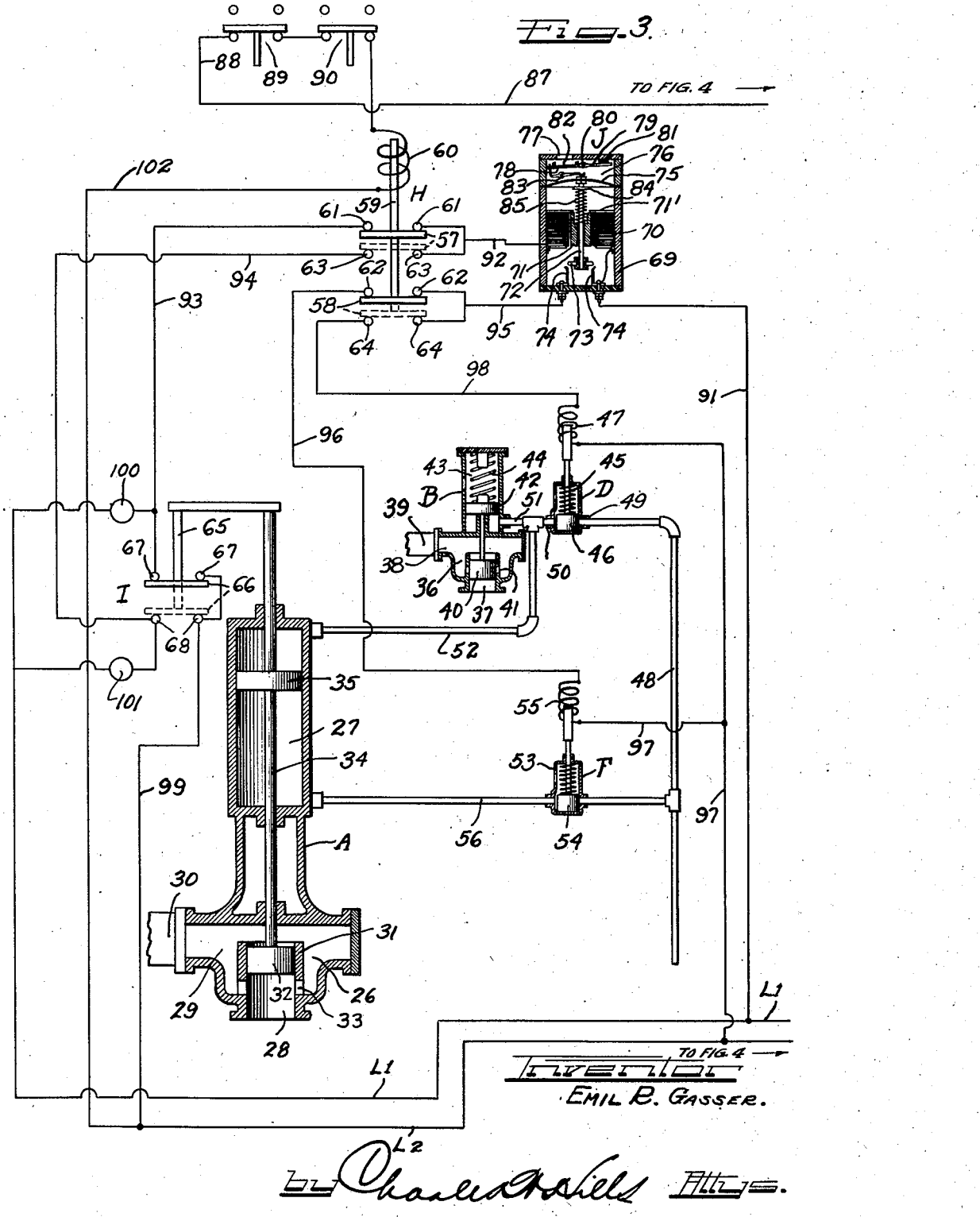

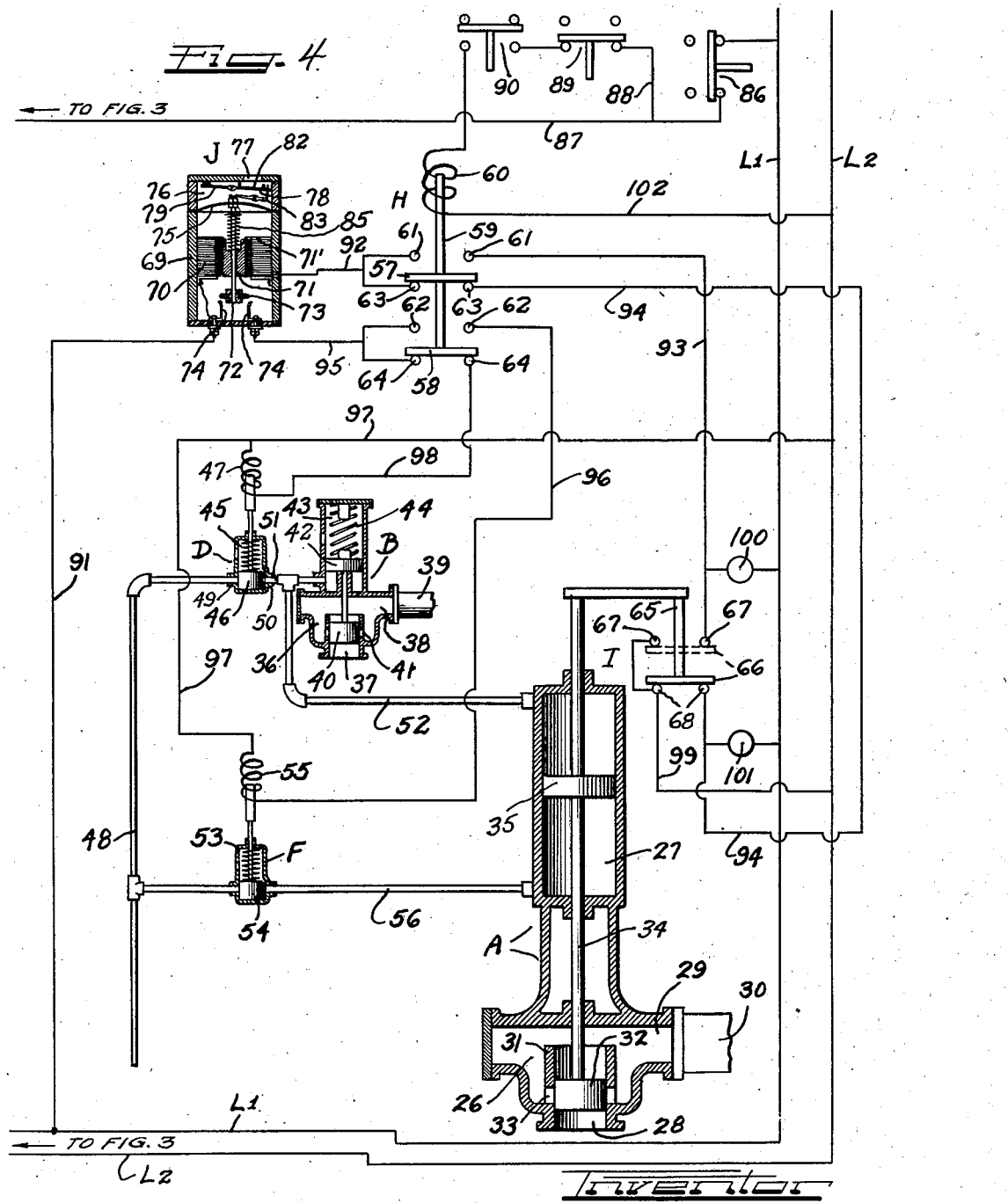

May 19, 1942.  E. R. GASSER  2,283,431
HYDRAULIC CLUTCH CONTROL SYSTEM
Filed Feb. 10, 1941  4 Sheets-Sheet 4
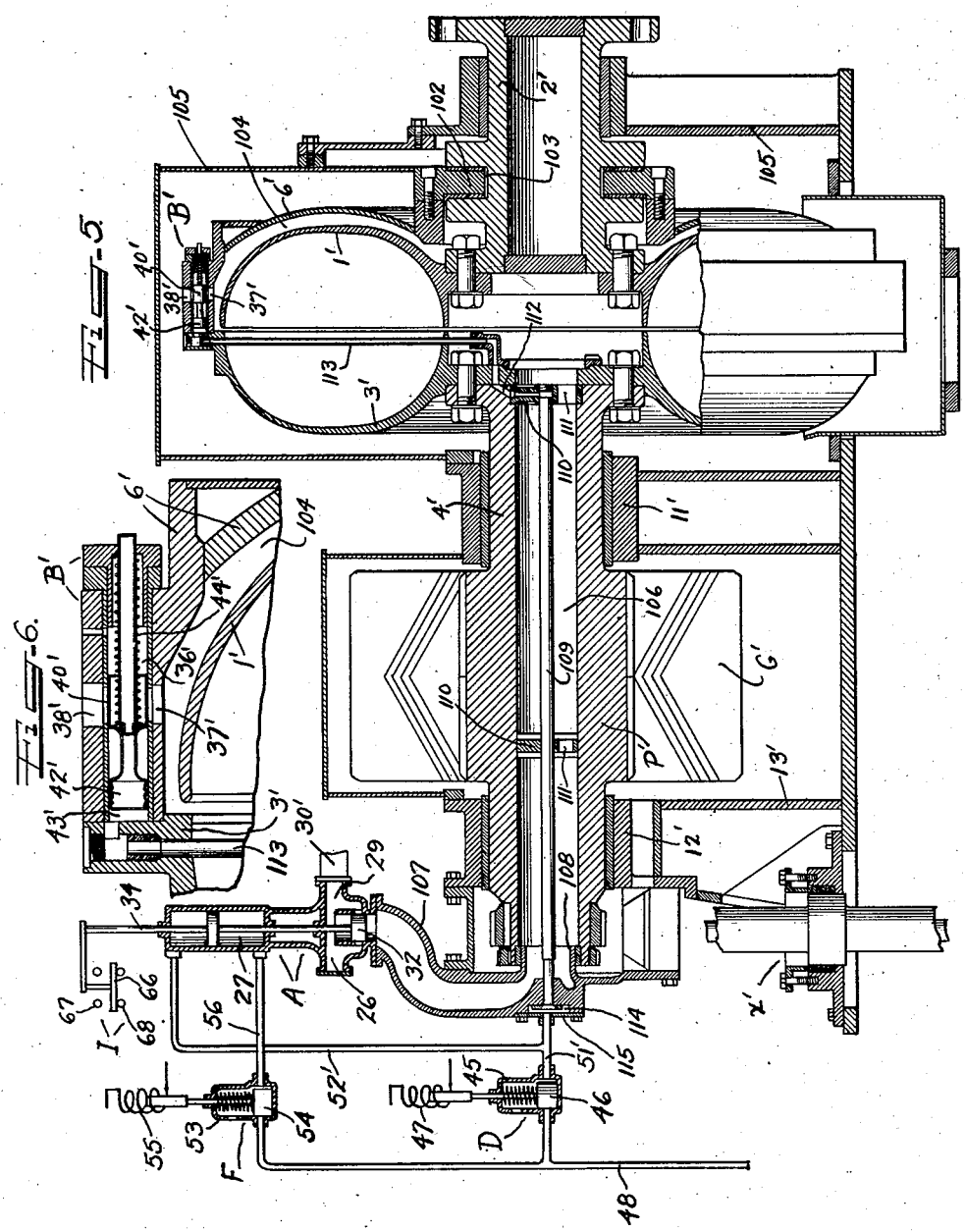
Inventor
EMIL R. GASSER.
by Charles O'Kelly Attys.

Patented May 19, 1942

2,283,431

UNITED STATES PATENT OFFICE 2,283,431

HYDRAULIC CLUTCH CONTROL SYSTEM

Emil R. Gasser, Buffalo, N. Y., assignor to Farrel-Birmingham Company, Incorporated, Ansonia, Conn., a corporation of Connecticut Application February 10, 1941, Serial No. 378,325

7 Claims. (Cl. 60—54)

This invention relates to automatic and remote control for hydraulic clutches now being used more and more for ship propulsion. In ship propulsion units now extensively used, one or a number of propulsion engines, such as Diesel engines, are used, each engine being connected by a hydraulic clutch to a reduction gear, which reduction gears mesh with a common gear mounted on the propeller shaft. Such propulsion arrangements generally require that any one of the driving engines can be connected or disconnected from the reduction gear without necessitating stopping or manipulation of the other engines, and sometimes it becomes necessary to detach one or more of these engines rapidly.

Hydraulic clutches are usually disconnected by removing the working fluid and for this purpose so-called dump valves are provided. Fluid inlet valves are also provided for the clutches through which the clutches may be refilled with working fluid after emptying thereof.

It is very desirable, particularly in ship propulsion, that these valve structures be operated by mediums controlled at some remote point, as for example at the operating stand of the ship, or on the bridge, or in some cases in the engine room, so that such control may be cooperative with other operations also controllable from the same remote point or station. It is therefore the important object of this invention to provide simple and efficient means, under control from a remote station, for automatically and with proper timing effecting the operation of the dumping and inlet valves of any one of the clutches or for any number thereof, and I preferably utilize electrical and fluid means for such operation of the valves.

More in detail, the object is to provide a control system in which the dumping and inlet valves are operated by fluid power, preferably pneumatic, and with the valve operating fluid flow controlled by electrical means including timing switches.

My improved system and its application to hydraulic clutches is fully disclosed on the drawings, in which drawings:

Figure 1 is a more or less diagrammatic plan view of a marine propulsion system to which the invention may be applied;

Figure 2 is a side elevation, partly in section, of one of the hydraulic clutches and the pinion driven thereby;

Figure 3 shows more or less diagrammatically the various valves and switches and the electrical and fluid circuits for control of the valves and switches for a filling operation of a clutch;

Figure 4 is a similar diagrammatic layout showing the control of the switches and valves for emptying of a clutch.

Figure 5 is a vertical section of a propulsion assembly in which the hydraulic clutch is of the quick dumping type; and Figure 6 is an enlarged section of the dumping valve.

Referring to Figure 1, two power units E are shown, which may be Diesel engines whose shafts are coupled to the respective clutch members C1 and C2, the runner element of each clutch connecting with a driving pinion P, the pinion meshing with a gear G whose shaft is connected, as for example, with a propeller S.

On Figures 1 to 4 I have shown my improved control system applied to clutches of the scoop tube type, and referring to Figure 2, each clutch comprises an impeller element 1 supported by the shaft 2 to which a driving or power unit E is coupled. The runner element 3 of the clutch is mounted on the end of a shaft 4 which carries a driving pinion P which meshes the gear G on the propeller shaft. The cover or inner casing 6 of the clutch is bolted to and turns with the impeller and incloses the back of the runner. An outer casing 7 is also bolted to the impeller and with the inner casing 6 provides a scoop tube chamber 8 into which the scoop tube 9 extends from the stationary structure 10 which surrounds the shaft 4 and is carried by the main bearing structure 11, the other end of the shaft being supported in the bearing structure 12. These bearings are provided on a housing or casing 13 for the gear G and the pinions P driven by the clutches.

The supporting hub of the runner element has an annular space 17 connected by inlet ports 18 with the working chambers of the clutch, and this space communicates with the annular space 19 in the frame 10, these spaces forming an inlet chamber to which leads the inlet passage 20 in the bearing structure 11. The scoop tube 9 connects with the annular space 21 which communicates with the outlet passageway 22 in the bearing structure 11.

Through the leak-off nozzle 23, hydraulic fluid may flow from the working circuit into the scoop chamber 8 from which it may overflow thru the clearance space 24 and passageway 25 into the housing 13 which will serve as a reservoir.

The clutch fluid inlet passageway 20 communicates with an inlet or clutch filling valve structure A which is mounted on the bearing structure 11, and a suitable pump X has its inlet connected with the reservoir 13 and its discharge end connected with the valve A, whereby working fluid may be supplied to the clutch. The outlet passageway 22 of the coupling communicates with a dump valve B mounted on the bearing structure 11 and whose outlet is connected with the reservoir 13, this dump valve controlling the emptying of the fluid from the clutch by way of the scoop tube 9.

The clutch inlet valve A is shown more or less diagrammatically on Figures 3 and 4. It comprises a valve chamber 26 and a piston chamber or cylinder 27. The valve is mounted on the bearing structure 11 of the driving assembly and has its outlet 28 connected with the inlet 20 and the valve inlet 29 is connected by the pipe 30 with the discharge end of the pump X. A guideway 31 extends into the valve chamber 26 for guiding the valve 32 for opening and closing of the ports 33 which extend between the valve chamber 26 and the outlet 28. A stem 34 extends from the valve into the piston chamber 27 where the piston 35 is mounted on the stem for movement in the piston chamber for setting of the valve to its open or closed position.

The dump valve B mounted on the housing 11 comprises a valve chamber 36 whose inlet 37 communicates with the outlet passageway 22 from the clutch and whose outlet 38 is connected by a pipe 39 with the reservoir 13. The valve 40 functions to open and close the ports 41 between the inlet 37 and the valve chamber 36 and is connected with a piston 42 in the piston chamber 43, a spring 44 tending to hold the valve 40 in closed position.

Fluid under pressure, preferably air, is utilized to control the movements of the pistons of the valves A and B. A valve structure D comprises the cylinder 45 for a valve 46 which is connected with the armature of a solenoid 47. An air line 48 connected to receive air under pressure from a suitable source (not shown) connects with the inlet 49 of the valve chamber 45 whose outlet 50 is connected by a pipe 51 with the piston chamber 43 of the valve B at a point below the piston 42 so that when air is admitted into the piston space below the piston, the piston will be moved for setting of the valve 40 to open position. Upon release of the air pressure, the spring 44 will return the valve to a closed position. Normally the valve 46 is in position between the inlet and outlet 49 and 50 respectively to shut off the air flow from the valve B.

A pipe 52 extends from the pipe 51 to the upper end of the piston chamber 27 of the inlet valve A and air flow through this pipe 52 is controlled by the valve structure D. Upon opening of the valve structure D, air will flow to the valve B and to the valve A for opening of the valve B and closing of the valve A.

A valve structure F controls the connection of the air line with the lower end of the piston chamber 27 of the inlet valve A. The valve structure F comprises the cylinder or valve chamber 53 for the valve 54 which is connected with the armature of a solenoid 55, the valve being normally in position to disconnect the air line 48 from the inlet valve A, but upon opening of the valve by the solenoid, air will flow from the air line through the pipe 56 to the lower end of the piston chamber 27 for upward movement of the piston and opening of the inlet valve.

Describing now the various electrical relays and switches, the main relay H is diagrammatically illustrated. It comprises upper and lower switch blades 57 and 58 on a bar 59 which is connected with the armature of a solenoid 60. In one position of the bar 59, the blade 57 will connect upper contacts 61 and the lower switch blade will connect upper contacts 62, while in the lower position of the bar 59 the blade 57 will connect the lower contacts 63 and the blade 58 will connect the lower contacts 64.

A switch I is controlled by the movement of the inlet valve A. As shown, the valve stem 34 at its outer end carries a switch bar 65 whose blade 66 is engageable either with the upper contacts 67 or the lower contacts 68.

A timing relay J is more or less diagrammatically shown and may be of the type and operation disclosed in prior art patents such as Patent No. 2,103,378, December 28, 1937. The relay comprises a housing 69 in which is a solenoid coil 70 surrounding a solenoid core 71 through which extends a spindle 72 having at its lower end a switch blade 73 for engagement with contacts 74. At its upper end the spindle connects with a diaphragm 75 closing one side of a chamber 76. The outer wall of the chamber 76 has a large port 77 adapted to be closed by a valve 78 at the end of a lever 79 fulcrumed at 80, a spring 81 tending to swing the lever to seat the valve to close the port 77. The valve has a metering orifice 82 which is preferably adjustable and this orifice offers the only path for air flow from the chamber 76 through the port 77 when the valve is closed. Below the valve is a lever 83 fulcrumed intermediate its ends, the outer end thereof being connected with the outer end of the valve lever 79 and at its inner end being in the path of the upper end of the spindle 72. Between the solenoid core 71 and an abutment 84 on the spindle, a spring 85 encircles the spindle for exerting upward pressure against the spindle when the relay coil is energized. When the relay coil is de-energized, the core 71 will be out of the coil and the spindle 72 will be in its lower position with the switch blade 73 connecting the circuit terminals 74. The diaphragm 75 will be held down by the spindle and the spindle will release the lever 83 so that the spring 81 may restore the valve lever 79 for seating of the valve 78 to close the port 77. Now when the relay coil is energized, the core 71 will be drawn up into the coil against the stop 71' and the spring 85 will be compressed and will move the diaphragm 75 upwardly. However, movement of the diaphragm compresses the air in chamber 76 and the only escape for this air is through the metering orifice 82 until the spindle end engages with the valve releasing lever 83 at which time the switch blade 73 is still in engagement with the terminals 74. As soon as the lever 83 is rocked by the spindle, the valve 78 will be moved from its seat to expose the large port 77 and then the diaphragm and the spindle will be moved quickly upwardly to the extent of the diaphragm movement and for disconnection of the switch blade 73 from the terminals 74 for opening of the circuit connected with these terminals. The opening of the circuit will thus be delayed by an interval of time depending upon the adjustment of the metering orifice 82 and the opening of the large port 77 by the spindle.

As Figure 1 of the drawings shows two driving sources and two clutches for the propulsion system, Figure 3 will show the control for one of the clutches C1 and Figure 4 will show the control for the other clutch C2, the setting on Figure 3 being for filling of the corresponding clutch and the setting on Figure 4 being for the emptying of the other clutch. The electrical circuits for control means extend from the main supply circuit L—I, L—2, the supply current being either direct current or alternating current. A conductor leads from the main line L—I through a main switch 86 to the supply conductor 87 for supplying the circuits for the respective clutches. For the electric controlling devices for each clutch, a conductor 88 extends from the supply conductor 87 serially through switches 89 and 90 to one terminal of the coil 60 of the main relay H, the other terminal of the coil connecting through conductor 102 with the side L—2 of the main supply line. A conductor 91 connects L—I with one of the switch contacts 74 of the timing relay J and one of the terminals of the relay coil 70. The other terminal of the coil is connected by conductor 92 with one set of terminals 61, 63 of the relay H, the other terminal 61 being connected by conductor 93 with one of the upper contacts 67 of the switch I, while the other terminal 63 of the relay H is connected by conductor 94 with one of the lower terminals 68 of the switch I.

The other terminal 74 of the timing relay J is connected by conductor 95 with one set of contacts 62 and 64 of the relay H. The other contact 62 of the relay H is connected by conductor 96 with one terminal of the coil 55 of the solenoid associated with the switch F, the other terminal of the coil being connected by conductor 97 with L—2. The other terminal 64 of the main relay H is connected by conductor 98 with one terminal of the coil 47 of the solenoid associated with the valve D, the other terminal of the coil connecting with the conductor 97 which connects with L—2. The other upper and lower terminals 67 and 68 of switch I are connected by conductor 99 with L—2.

When the main switch 86 is closed for current flow to the supply line 87, and the switches 89 and 90 for each clutch-controlling assembly are closed, the clutch inlet valves will be open and the dumping valves will be closed. If at any of the control assemblies, either of the switches 89 or 90 is opened, the inlet valve for the corresponding clutch will be closed and the dumping valve will be opened for dumping of the clutch. If the main switch 86 is opened, then both clutches will be emptied.

The main switch 86 and the switches 89 and 90 have two sets of contacts, one set for closing the supply connection to the clutch-controlling assemblies and the other contacts being engageable by the switches for controlling circuits for other apparatus during whose operation the clutches should be empty. Thus, when the switches 86 and 89 are moved into engagement with their other contacts, the supply circuit to the clutch-controlling assemblies will be opened and the dumping valves of these assemblies will be opened and the clutches emptied.

On the control assembly shown on Figure 3 for the clutch C—1, main switch 86 (Figure 4) and both local switches 89 and 90 are closed and the clutch inlet valve A has been opened for filling of the clutch. The main relay H is energized by current flow from the supply conductor 87 through the switches 86, 89 and 90 and the solenoid coil 60 and conductor 102 to L—2. The timing relay J is energized by current flow from L—I through conductor 91, solenoid coil 70, the upper contacts 61 of relay H, conductor 93, the upper contacts of switch I to L—2, the timing relay J being then open so that current flow through the switch F is interrupted.

The control assembly shown on Figure 4 for the clutch C—2 shows the condition after current supply to the assembly has been interrupted by opening of the switch 90, the operation after such opening of the switch resulting in closure of the clutch inlet valve A and opening of the dumping valve B. Before opening of the valve 90, the conditions were those shown on Figure 3, the clutch inlet valve being open and the dump valve closed. When the switch 90 is opened for dumping of the clutch C—2, the circuit through the main relay H is interrupted and the switch blades 57 and 58 disconnect from the respective upper contacts and engage respectively with the lower contacts 63 and 64. The circuit through the timing relay J, which before de-energization of the relay H was completed through contacts 61, is now interrupted to permit the timing relay to engage its switch blade 73 with the contacts 74. We now have the circuit closed for the operation of the dumping valve B, this circuit being from L—I, conductor 91, the timing relay contacts 74, contacts 64 of the main relay H, conductor 98, solenoid coil 47, and conductor 97 to L—2. The resulting operation of the valve D by the solenoid 47 will connect the air line 48 with the dump valve B and the clutch inlet valve A through piping 51 and 52. The piston 42 of the dump valve will be operated by the air pressure to open the valve 40 for dumping into the reservoir the hydraulic fluid scooped up out of the clutch by the scoop tube. At the same time, the piston 35 of the inlet valve A will be moved by the air pressure to close the valve 32 and therefore the fluid inlet to the clutch. It will be remembered that before the switch 90 was opened for a dumping operation, the inlet valve A was open, as shown on Figure 3, and the blade 66 of the switch I was in engagement with the upper contacts 67. The circuit through the solenoid 47 will be kept closed and the dumping valve B will be held open so long as the timing relay J remains de-energized. Such de-energization will continue until the inlet valve is closed and the switch blade 66 moved into engagement with the contacts 68 of the switch I. The movement of the switch I for engagement with contacts 68 requires a certain time interval and this interval will give the timing relay J ample time to fully reset itself for a complete timing operation for re-opening thereof when it is re-energized. As soon as the contacts 68 of the switch I are engaged, the timing relay will be re-energized through the circuit from L—I, conductor 91, coil 70, contacts 63 of the main relay H, conductor 94, contacts 68 of switch I, and conductor 99 to L—2. The timing relay now starts its timed operation at the end of which the switch blade 73 will be disconnected from the contacts 74 to break the circuit through the solenoid 47 which results in cutting off of the air from the dumping valve B and the inlet valve A, and the dumping valve is returned by its spring 44 to its closed condition. By adjustment of the timing valve orifice 82, the timing relay can be set for any desired period of operation of the dumping valve, depending on the engine speed, size of the clutch, and other conditions. By the introduction of the switch I under control of the clutch inlet valve A, a time lag of ample duration is automatically introduced to allow the timing relay J to become fully reset to closed position and to hold the circuit for the solenoid 47 closed for full opening of the dumping valve before re-energization of the relay, so that a full timing period of operation for reopening of the relay and the full period of opening of the dumping valve is assured. At the end of a dumping operation, the timing relay remains energized so as to keep the dumping circuit open.

If it is now desired to refill the clutch, the switch 90 is closed, and we have the operating condition shown on Figure 3. The main relay H is now energized to move its switch blades 57 and 58 into engagement with the upper contacts 61 and 62 respectively. The circuit for the timing relay J, which before closure of the switch 90 was completed through the lower contacts 63 of the relay H and the lower contacts 68 of the switch I, is now open and the de-energized timing relay drops back to closed position ready for a timed reopening operation. While the timing relay is closed, the valve F is opened by the energization of the solenoid 55 through the circuit extending from L—1, conductor 91, timing relay J, contacts 74, contacts 62 of the main relay H, conductor 96, solenoid coil 55, and to L—2. Air will now flow from the air line 48 through the valve F to the lower end of the piston chamber 27 of the inlet valve A, and the valve 32 will be opened. Opening movement of the inlet valve is accompanied by movement of the switch I for connection of the upper contacts 67 for reclosure of the re-energizing circuit for the timing relay, the circuit being from L—1, conductor 91, the timing relay coil 70, contacts 61 of the main relay H, conductor 93, the upper contacts 67 of the switch I, and to L—2. The timed operation of the relay J then takes place for reopening of the circuit of solenoid 55 and reclosure of the valve F after the inlet valve A has been fully opened.

Signal devices such as signal lamps 100 and 101 may be associated with each control assembly. As shown, a lamp 100 is included in the circuit from L—1 through the upper contacts 67 of the switch I when the clutch inlet valve is opened and the clutch is being filled, and a signal lamp 101 is included in circuit with the lower contacts 68 of the switch I when the clutch is empty.

The control switches 86, 89 and 90 may be designed for manual operation or for solenoid operation from some remote point. Upon operation of the switch 89 for any one of the clutch control assemblies for connecting in other apparatus, the control circuit for the clutch will be automatically opened for dumping of the clutch. If the main switch 86 is set for service of other apparatus, the control circuit for all the clutches will be opened and all the clutches will be emptied for driving disconnection from the respective engines.

On Figures 5 and 6, the hydraulic clutch associated with the driving assembly is of the quick dumping type in which one or more dumping valves B' are mounted on the clutch runner element. In the arrangement shown, the clutch impeller element 1' is secured to the driving shaft 2', the runner element 3' being secured to the end of the driven shaft 4' which mounts the pinion P' meshing with the gear G'. The cover structure 6' is secured at its periphery to the periphery of the runner element and terminates in a thrust bearing ring 102 engaging in the bearing channel 103 provided on the shaft 2'. The space 104 between the cover 6' and the impeller element is in communication with the hydraulic working space between the impeller and runner elements.

Referring particularly to Figure 6, a dumping valve B' is shown mounted on the cover structure 6', the general arrangement in this valve being the same as that for the valve B shown on Figures 3 and 4, and therefore the same reference numerals primed have been applied thereto. The inlet 37' of the valve communicates with the space 104 and the outlet 38' from the valve communicates with the interior of the housing 105 which is stationary and which surrounds the clutch structure. When the valve is opened, the working fluid will be rapidly drained from the clutch through the valve and into the interior of the housing 105.

In the arrangement on Figures 5 and 6, the fluid supply to the clutch is by way of the bore 106 of the pinion shaft 4'. An inlet structure 107 is stationarily mounted on the housing 13' and has a nozzle 108 projecting into the outer end of the bore 106. The inlet valve A is mounted on the structure 107, the valve inlet being connected by a pipe 30' with the pump indicated at X'.

The air supply for operation of the dumping valve B' is also by way of the bore 106 of the pinion shaft. An air pipe 109 extends axially through the bore 106 and is supported by cross-wall members 110 within the bore so that the pipe will rotate with the shaft, these cross-wall members having passageways 111 therethrough for the flow of the hydraulic fluid to the clutch.

At its inner end, the pipe 109 communicates with a passageway 112 extending through the inner wall member 110 and the hub portion of the runner element 3', the passageway communicating with a pipe 113 extending radially through the runner element for communication at its outer end with the piston chamber 43' of the dumping valve B', as more clearly shown on Figure 6.

At its outer end, the pipe 109 has bearing in the fluid inlet structure 107 and terminates in a chamber 114 closed by a cover 115. The solenoid controlled valve structure D controls the flow of air from the air line 48 to the pipe 109, the outlet pipe 51' from the valve D extending through the cover 115 for communication with the chamber 114.

The control of the structures on Figures 5 and 6 by the various relays and valves will be the same as the control of the structure on Figure 2 as illustrated on Figures 3 and 4. If it is desired to dump the clutch, the main relay H (Figure 4) is interrupted by the opening of the main switch 86, or either of the local valves 89 and 90. The solenoid 47 for the valve D (Figure 5) will then be connected in circuit for opening of the valve and air flow from the air line 48 to the inlet valve A for closure of this valve, and for flow of air through the pipe 109 and the pipe 113 to the valve chamber 43' of the dumping valve B' for outward shift of the piston 42' and opening of the valve 40' for the outflow of the clutch fluid from the space 104, through the valve B' and into the housing 105. For refilling of the clutch, the circuit for the main relay H (Figure 3) is closed for inclusion of the solenoid 55 of the valve F in circuit so that this valve will be opened for air supply to the inlet valve A for opening of this valve.

Upon setting of the system for closure of the inlet valve and opening of the dumping valve, the timing relay J, under control of the switch I, functions to delay for the predetermined time period, the closure of the dumping valve in the manner already fully explained.

I thus provide a practical and efficient system under remote control for opening the dump valves of one or a number of hydraulic clutches and simultaneously controlling the flow of working fluid for the clutches, and in which system opening of a dump valve for a predetermined period of time is automatically assured. I do not, however, desire to be limited to the exact arrangement and operation shown and described as changes and modifications may be made without departing from the scope of the invention.

I claim as follows:

1. A control system for a hydraulic clutch provided with a fluid inlet valve and a fluid dumping valve, comprising electrical means controlling the opening of the dumping valve and coincidental closing of the inlet valve, an electrical circuit for said electrical means and a timing relay controlling said circuit, a switch operated by the closing movement of the inlet valve, a main relay, and an energizing circuit for said timing relay conjointly controlled by said inlet valve operated switch and said main relay.

2. A control system for a hydraulic clutch provided with a fluid inlet valve and with a dumping valve normally spring closed, comprising electrical means controlling when energized the opening of the dumping valve and coincidental closing of the inlet valve, a main relay, a timing relay, a switch operated by the closing movement of the inlet valve, an energizing circuit for said electrical means conjointly controlled by said main relay and said timing relay, an energizing circuit for said timing relay conjointly controlled by said main relay and said inlet valve operated switch to be closed after closure of the inlet valve for timing operation of the timing relay to open said electrical means circuit for resulting closure of the dumping valve, the inlet valve remaining closed.

3. A control system for a hydraulic clutch provided with a normally open fluid inlet valve and a normally spring closed dumping valve, comprising electrically operated means for coincidentally controlling the opening of the dumping valve and closing movement of the inlet valve, an electrical circuit for said electrically operated means, an electrical timing relay, a switch controlled by said inlet valve to be set in a first position when said inlet valve is open and to a second position after closing movement of said inlet valve, a main switch adapted to be set to a first position and to a second position, a normal energizing circuit for said timing relay closed by said main switch and said inlet valve controlled switch for holding said timing relay open, a re-energizing circuit for said timing relay, movement of said main switch to its second position opening said normal energizing circuit and closing at one point said re-energizing circuit, opening of the normal energizing circuit causing said timing relay to close said electrically-operated means circuit for opening of the dump valve and movement of the inlet valve to its closed position and movement of the inlet valve controlled switch from its first position to its second position to complete the closing of the re-energizing circuit for re-energization of said timing relay and delayed reopening thereby of said electrically-operated means circuit and closure of the dumping valve, the interval of time of movement of the inlet valve controlled switch from its first position to its second position being of sufficient duration to permit said timing relay to hold said electrically-operated means circuit closed for full opening of said dumping valve before said re-energizing circuit is closed for delayed re-opening by said timing relay of said electrically-operated means circuit and closure of said dump valve, said inlet valve remaining closed after such timing operation.

4. A control system for a hydraulic clutch having a normally open fluid inlet valve and a normally closed fluid dumping valve, comprising electrically controlled means for opening the dump valve and closing the inlet valve, a circuit for said electrically controlled means normally open and adapted when closed to effect operation of said electrically controlled means for opening of the dump valve and closure of the inlet valve, an electrical timing relay adapted when de-energized to quickly close said circuit for said electrically controlled means and when re-energized to effect a reopening of said circuit after a predetermined time interval, a normally closed energizing circuit for said timing relay and a normally open re-energizing circuit therefor, means for opening said normal energizing circuit for operation of said timing relay for closure of said electrically controlled means circuit and opening of said dump valve, and closing of said inlet valve, and a switch effective at the end of the closing movement of said inlet valve for closing said re-energizing circuit for a timing operation of said timing relay to re-open said electrically controlled means circuit for release of said dump valve, said inlet valve then remaining closed.

5. A control system for a hydraulic clutch having a normally spring closed dump valve and a normally open fluid inlet valve, comprising electrically controlled means operative to open said dump valve and close the inlet valve, a circuit for said electrically controlled means normally open to render said electrically controlled means inoperative, an electrical timing relay adapted when de-energized to quickly close said circuit for operation of said electrically controlled means and when re-energized to reopen said circuit after a predetermined time interval during which said dumping valve is held open, a normally closed energizing circuit for said relay for holding it fully open, means for opening said normal energizing circuit for quick movement of said relay to close said electrically controlled means circuit, a re-energizing circuit for said relay, and an electrical switch movable with said inlet valve to close said re-energizing circuit when said inlet valve reaches its closing position, said electrically controlled means fully opening said dumping valve during the movement of said inlet valve to closed position, whereafter the re-energized relay will start its timing operation to open said electrically controlled means circuit after the predetermined timing interval for release of the dumping valve for spring closure thereof, said inlet valve then remaining closed.

6. A control system for a hydraulic clutch comprising a normally open fluid inlet valve and a normally spring closed fluid dumping valve, both operable by fluid under pressure, a source of fluid under pressure, a valve for controlling the connection of said source with said dumping valve and said inlet valve for opening of said dumping valve and coincidental closing movement of said inlet valve, electrically controlled means controlling the operation of said control valve, a circuit for said electrically controlled means, an electrical timing relay adapted when de-energized to comparatively quickly close said circuit for resulting operation of said control valve for opening of the dump valve and closure movement of the inlet valve and when re-energized to effect a reopening of said circuit after a predetermined time interval, a normally closed energizing circuit for said timing relay and a normally open re-energizing circuit therefor, means for opening said normal energizing circuit for operation of said timing relay for closure of said electrical circuit, and a switch effective at the end of the closing movement of said inlet valve for closing said re-energizing circuit for a timing operation of said timing relay to re-open said electrical circuit for operation of said control valve to disconnect said dump valve and inlet valve from said pressure fluid source, said inlet valve then remaining closed.

7. A control system for a hydraulic clutch having a normally open fluid inlet valve, comprising electrical control means for the inlet valve, a circuit for said electrically controlled means normally open and adapted when closed to effect operation of said electrically controlled means for closing of the inlet valve, an electrical timing relay adapted when de-energized to comparatively quickly close said circuit for said electrically controlled means and when re-energized to effect a re-opening of said circuit after a predetermined time interval, a normally closed energizing circuit for said timing relay and a normally open re-energizing circuit therefor, means for opening said normal energizing circuit for operation of said timing relay for closure of said electrically controlled means circuit, a switch effective at the end of the closing movement of said inlet valve for closing said re-energizing circuit for a timing operation of said timing relay to open said electrically controlled means circuit, a dump valve for the clutch, yielding means tending to hold said dump valve normally closed, and means rendered effective by the operation of said electrically controlled means to fully open said dump valve while said inlet valve is being closed, whereafter said dump valve will remain open during the timing operation of said relay and will be reclosed when said timing relay is reopened, said inlet valve then remaining closed.

EMIL R. GASSER.